United States Patent
Hamulski

(10) Patent No.: US 7,138,024 B2
(45) Date of Patent: Nov. 21, 2006

(54) PROCESS FOR PRODUCING AN ELASTIC COMPOSITE FILM HAVING A TEXTILE SURFACE

(75) Inventor: Markus Hamulski, Gronau-Epe (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 158 days.

(21) Appl. No.: 10/374,344

(22) Filed: Feb. 26, 2003

(65) Prior Publication Data

US 2003/0183316 A1   Oct. 2, 2003

(30) Foreign Application Priority Data

Mar. 2, 2002   (DE) .................... 102 09 302

(51) Int. Cl.
*B32B 37/02*   (2006.01)
(52) U.S. Cl. ............. 156/164; 156/163; 156/229; 156/290; 156/291; 156/324
(58) Field of Classification Search ........ 156/229, 156/290–292, 324, 496; 442/286–293, 394–399; 428/131, 134–138, 198; 604/385.01
See application file for complete search history.

(56) References Cited

U.S. PATENT DOCUMENTS

| | | | |
|---|---|---|---|
| 5,344,691 A | | 9/1994 | Hanschen et al. |
| 5,626,571 A | * | 5/1997 | Young et al. ............... 604/370 |
| 5,683,787 A | | 11/1997 | Boich et al. |
| 5,814,178 A | * | 9/1998 | Jacobs ................... 156/290 |
| 6,383,431 B1 | * | 5/2002 | Dobrin et al. ............. 264/154 |
| 6,620,485 B1 | * | 9/2003 | Benson et al. ............ 428/156 |
| 6,942,894 B1 | * | 9/2005 | Alberg et al. ............. 427/256 |

FOREIGN PATENT DOCUMENTS

| | | |
|---|---|---|
| EP | 0 674 581 | 6/1996 |
| EP | 0 521 883 | 8/1996 |

\* cited by examiner

*Primary Examiner*—Jessica Rossi
(74) *Attorney, Agent, or Firm*—Collard & Roe, P.C.

(57) ABSTRACT

A process for producing an elastic composite film having a textile surface including at least one unwinding fibrous web being irreversibly extended at right angles to its direction of transport. The increase in the width of the fibrous web due to transverse extension is formed into foldlets by pulling tension acting in the direction of transport of the fibrous web. The fibrous web, which is under pulling tension and modified by transverse extension, is applied atop a transversely elastic film web of a thermoplastic elastomer and is adhered or welded thereto at contact sites which are spaced apart at right angles to the direction of transport of the webs.

6 Claims, No Drawings

PROCESS FOR PRODUCING AN ELASTIC COMPOSITE FILM HAVING A TEXTILE SURFACE

CROSS REFERENCE TO RELATED APPLICATIONS

Applicant claims priority under 35 U.S.C. §119 of German Application No. 102 09 302.4 filed Mar. 2, 2002.

BACKGROUND OF THE INVENTION

1. Field of the Invention

This invention relates to a process for producing a composite film which has a textile surface and which can be used for example for producing diaper pants or as closure tapes.

2. The Prior Art

U.S. Pat. No. 5,683,787 describes a process wherein a continuous fibrous web is applied to an elastic film web. The elastic film web is composed of a thermoplastic elastomer, and the fibrous web is adhered or welded thereto at spaced apart contact sites. The laminate is subsequently extended up to close to the breaking extension limit of the fibers of the fibrous web and untensioned or relaxed again. The stretching, which is also referred to as activation, serves to improve the extensibility of the composite film.

U.S. Pat. No. 5,344,691 describes a process for producing a composite film which has elastic and nonelastic regions at predetermined sites. The first step is to produce, preferably by coextrusion, a laminate which has an elastic layer of a thermoplastic elastomer and at least one cover layer of a thermoplastic polymer of low elasticity, for example a polyolefin. Predetermined regions are subsequently activated by stretching to create a composite film having extensible and less extensible sections.

Existing processes expose not only the fibrous web but also the elastic layer to great stress in the course of the mechanical activation. It is consequently necessary to use elastic films which are sufficiently thick to withstand the mechanical stresses. When apertured and hence air-pervious films are used, there is a danger of cracking between the apertures.

SUMMARY OF THE INVENTION

It is an object of the present invention to provide a process for producing an elastic composite film without the elastic layer being subjected to significant mechanical stresses, making it possible to produce composite films having a very thin elastic layer which may even be apertured if desired.

This object is achieved by the invention which provides a process for producing an elastic composite film having a textile surface. The process includes irreversibly or permanently extending at least one unwinding fibrous web at right angles to its direction of transport. The increase in the width of the fibrous web due to transverse extension is formed into foldlets or tiny wrinkles by pulling tension acting in the direction of transport of the fibrous web. The fibrous web, which is under pulling tension and modified by transverse extension, is then applied atop a transversely elastic film web of a thermoplastic elastomer and adhered thereto for example by welding at contact sites which are spaced apart from each other at right angles to the direction of transport of the webs.

A permanent extension of the fibrous web, i.e. a stretching past the elastic limit of the fibrous web, serves to loosen the material by partial destruction of the fibrous structure. The fibrous web undergoing stretching and further processing into the composite film is under pulling tension in the direction of transport. The pulling tension is sufficient for the increase in the width of the fibrous web due to the irreversible transverse extension not becoming visible, but becoming noticeable in the form of small foldlets or thin places in the fibrous web. The irreversible transverse extension creates in the fibrous web a structure which deforms in the pre-extended direction almost without force being needed. The foldlet formation generated in the direction of transport by a simultaneously applied pulling tension allows elasticity to develop in the pre-extended direction.

When the webs forming the composite film are adhered together, the adhesive is preferably applied in parallel, narrow stripes to one of the sheets to be joined together. A customary hotmelt adhesive can be used. As well as adhering by adhesive, it is also possible for the elastic film web and the pre-treated transversely extended fibrous web to be spot welded together by means of ultrasound.

The pre-stretched fibrous web may be applied atop an elastically extended film and firmly joined to the film before the film relaxes. Preferably, however, the elastic film is in a relaxed state when being bonded to the pre-stretched fibrous web. This embodiment is especially advantageous when the film web is apertured before the fibrous web is applied. Aperturing means that the elastic film web is perforated. For example through use of a hot needle roll, the elastic film web may be provided with air openings between 0.5 and 2 mm in diameter. Because the film web is not extended, the inherent danger of cracking between the apertured points diminishes appreciably. It is possible to use very thin elastic film webs.

The process of this invention can also be used to produce a composite film having textile surfaces and elastic and nonelastic regions. A region of low elasticity is producible in a surprisingly simple manner. To produce this elastic composite film having nonelastic regions, the fibrous web, which is modified by transverse extension and is under pulling tension in the direction of transport, is uniformly bonded to the elastic film web in the section concerned. The elastic film web and the fibrous web can be heated to the melting temperature of the thermoplastic elastomer in the section to be bonded uniformly and pressed together. Alternatively, the elastic film web and the fibrous web are adhered together by a uniform application of adhesive in the section which forms a nonelastic region of the composite film. If desired, changes in the allocation or width of the elastic and nonelastic regions can be achieved by changing the format of the adhering operation. There is no need to change tools for a mechanical activation. The fibrous web can always be continuously extended in the transverse direction regardless of the location of the nonelastic regions of the composite film. This appreciably facilitates process control and conversion work when the allocation of the elastic and nonelastic regions is to be changed.

DETAILED DESCRIPTION OF PREFERRED EMBODIMENTS

OPERATIVE EXAMPLES

In a first operative example, a polypropylene fibrous web was extended in a transverse direction in a drawing assembly and subsequently, while under pulling tension in the direction of transport, applied atop a 75 μm thick web of thermoplastic elastomer based on styrene-ethylene block copolymer (SEBS) and adhered thereto. The adhering was effected using a hotmelt adhesive based on a styrene-isoprene-styrene block copolymer (SIS), which was applied in parallel, narrow stripes to one of the sheets to be joined together. The composite film produced by the process described possesses high tensile strength in the machine direction and is elastic in the cross direction.

In a second operative example, the previously described process was employed to apply a fibrous web permanently extended in the transverse direction atop an SEBS film web 75 μm in thickness. The composite film has by virtue of the presence of fibrous web materials on both sides a pleasant textile character and also the previously described extension properties.

In a third operative example, the elastic film web was apertured by means of a hot needle roll before the pre-stretched fibrous web was applied. The apertures were disposed in lines at an angle of 45° and were about 0.8 mm in diameter. The apertures were 3.7 mm spaced apart. The fibrous web irreversibly extended in the transverse direction was while under pulling tension in the direction of transport applied in the above-described manner to the film web on both sides thereof. The composite film produced by the process possesses high elasticity in the transverse direction, a pleasant textile character and additionally benefits from a high perviousness.

In a fourth operative example, a film produced by the process of example 1 according to this invention was cut into strips 75 mm in width for further processing. In further processing, the composite film was pressed in edge regions of 15 mm each between two rolls at 135° C. for consolidation. This created a composite film which is compact and nonelastic at the edges, which are each 15 mm in width. The composite film possesses very good elasticity in a central region 35 mm in width, and is extendable by 100% in this central region.

While only a few embodiments of the present invention have been shown and described, it is to be understood that many changes and modifications may be made thereunto without departing from the spirit and scope of the invention as defined in the appended claims.

What is claimed is:

1. A process for producing a composite film having a textile surface and elastic and nonelastic regions comprising sequentially in the named order the steps of:

(a) permanently extending at least one fibrous web at right angles to a direction of web transport to generate an increase in width of the fibrous web;

(b) applying pulling tension to the fibrous web in the direction of web transport to form the increase in width of the fibrous web into foldlets;

(c) applying said fibrous web while said fibrous web is under said pulling tension to a surface of a transversely elastic film web of a thermoplastic elastomer; and (d) joining said fibrous web while said fibrous web is under said pulling tension and said elastic film is in an untensioned state when being joined to the fibrous web;

wherein the step of joining comprises uniformly bonding the fibrous web to the elastic film web in at least one section to form a nonelastic region of the composite film and bonding the fibrous web to the elastic film web at contact sites spaced apart at right angles to the direction of web transport to form an elastic region of the composite film.

2. The process as claimed in claim 1, wherein the step of forming the elastic region of the composite film comprises applying adhesive in parallel strips to one of the webs to be joined together.

3. The process as claimed in claim 1, wherein the step of joining comprises spot welding the elastic film web and the fibrous web together by means of ultrasound.

4. The process as claimed in claim 1, wherein the elastic film web is provided with apertures before the fibrous web is applied.

5. The process as claimed in claim 1, wherein the step of joining comprises heating the elastic film web and the fibrous web to the melting temperature of the thermoplastic elastomer in the section to be bonded uniformly and pressing the elastic film web and the fibrous web together.

6. The process as claimed in claim 1, wherein the step of joining comprises adhering the elastic film web and the fibrous web together by a uniform application of adhesive in the section which forms the nonelastic region of the composite film.

* * * * *